US006878267B1

(12) United States Patent
Mandia

(10) Patent No.: US 6,878,267 B1
(45) Date of Patent: Apr. 12, 2005

(54) FISH TANK VACUUM

(76) Inventor: Ralph Mandia, 3098 Richmond Rd., Staten Island, NY (US) 10306

( * ) Notice: Subject to any disclaimer, the term of this patent is extended or adjusted under 35 U.S.C. 154(b) by 0 days.

(21) Appl. No.: 10/706,800

(22) Filed: Nov. 12, 2003

(51) Int. Cl.[7] ............................................. A01K 63/04
(52) U.S. Cl. .................... 210/169; 210/232; 210/416.2; 119/259
(58) Field of Search ................................ 210/169, 232, 210/416.1, 416.2; 119/259

(56) References Cited

U.S. PATENT DOCUMENTS

| | | | | |
|---|---|---|---|---|
| 2,737,490 A | * | 3/1956 | Lambertson | 210/169 |
| 2,956,507 A | * | 10/1960 | Hutchinson | 417/478 |
| 3,734,853 A | | 5/1973 | Horvath | 210/169 |
| 3,827,560 A | | 8/1974 | Morton | 210/169 |
| 4,035,299 A | | 7/1977 | Vroeginday | 210/169 |
| 5,240,596 A | * | 8/1993 | Chesnut | 210/136 |
| 5,266,190 A | | 11/1993 | Tominaga | 210/169 |
| 5,269,338 A | | 12/1993 | Figas | 137/140 |
| 5,279,730 A | | 1/1994 | Chen | 210/169 |
| 5,585,010 A | | 12/1996 | Dockery et al. | 210/805 |
| 5,695,654 A | * | 12/1997 | Schultz | 210/780 |
| 5,807,480 A | * | 9/1998 | Kanazawa | 210/120 |
| 6,444,120 B1 | * | 9/2002 | Morgan | 210/169 |

* cited by examiner

Primary Examiner—Fred G. Prince
(74) Attorney, Agent, or Firm—Goldstein Law Offices PC

(57) ABSTRACT

A fish tank vacuum, for use with a fish tank having a fish tank interior and an intake pipe, for removing debris from the fish tank interior with a suction nozzle. An attachment assembly connects to the intake pipe for establishing water flow into the suction nozzle. The suction nozzle is attached to a filter housing that holds a filter disk. Swivel assemblies are connected to the attachment assembly and the filter housing. A flexible tube extends between the swivel assemblies and allows the suction nozzle to easily move around the fish tank interior for debris removal.

6 Claims, 4 Drawing Sheets

FISH TANK VACUUM

BACKGROUND OF THE INVENTION

The invention relates to a fish tank vacuum. More particularly, the invention relates to a vacuum assembly that attaches to an existing fish tank filtration system inlet pipe and facilitates cleaning debris from the tank interior.

A fish tank is a scaled, man-made representation of an actual aquatic habitat. In order to sustain marine life therein, the tank must closely resemble its natural counterpart in everyway. Several practical limitations, however, prevent the true duplication of all environmental constraints. For example, many organisms and microorganisms that keep our oceans, lakes, streams, and rivers clean are typically not present in a fish tank. Accordingly, certain waste debris tends to accumulate, and must be removed before it reaches toxic levels that will-harm the fish. In addition, as debris accumulates in the fish tank it becomes unsightly.

One way in which waste levels are controlled in a fish tank is through water changes. Periodically replacing a portion of the tank water dilutes waste products and lowers their average concentration. Many waste products and solid debris, however, remain at the bottom. Accordingly, when water is "skimmed from the top" during a water change, there is little impact upon accumulated waste on the tank bottom.

Fish tank caretakers often attempt to scoop debris from the bottom. However, doing so only tends to disperse the debris through the water, as water currents carry the debris away while it is being lifted. In addition, because the fish tank bottom is often made of a substrate of sand, gravel, or crushed stone, it is difficult to remove waste products without removing the substrate.

Various devices have been proposed that attempt to provide fish tank cleaning systems. In particular, U.S. Pat. No. 5,240,596 to Chesnut; 5,279,730 to Chen; 5,266,190t to Tominaga; 5,585,010 to Dockery et al. 4,035,299 to Vroeginday; 5,269,338 to Figas; 6,058,884 to Rawls; and 3,734,853 to Horvath disclose various devices that employ a submersible tube for removing fish tank debris.

While these units may be suitable for the particular purpose employed, or for general use, they would not be as suitable for the purposes of the present invention as disclosed hereafter.

SUMMARY OF THE INVENTION

It is an object of the invention to produce a system that facilitates cleaning the interior of a fish tank. According to the present invention, a fish tank vacuum is submersible into the fish tank interior to remove debris therefrom.

It is another object of the invention to provide a fish tank vacuum that is easily adaptable to any existing aquarium and maintains a closed water system. Accordingly, the fish tank vacuum attaches to the water intake pipe of the existing filtration system so as to re-circulate all water drawn through the vacuum. The intake pipe is connected using a sealing cap that is configured to accommodate intake pipes of various diameters.

It is a further object of the invention to provide a fish tank vacuum that removes debris with an easily cleanable and replaceable filter. Accordingly, the filter is located just proximal of the suction nozzle and is held in place by the suction nozzle. Accordingly the filter may be removed by simply removing the suction nozzle.

It is a still further object of the invention to provide a fish tank vacuum that is easily maneuvered to all areas of the fish tank. Accordingly the nozzle and attachment assembly are connected by a flexible hose. The flexible hose is connected at both ends with swivel assemblies that allow three hundred sixty degree rotation thereat.

The invention is a fish tank vacuum, for use with a fish tank having a fish tank interior and an intake pipe, for removing debris from the fish tank interior with a suction nozzle. An attachment assembly connects to the intake pipe for establishing water flow into the suction nozzle. The suction nozzle is attached to a filter housing that holds a filter disk. Swivel assemblies are connected to the attachment assembly and the filter housing. A flexible tube extends between the swivel assemblies and allows the suction nozzle to easily move around the fish tank interior for debris removal.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
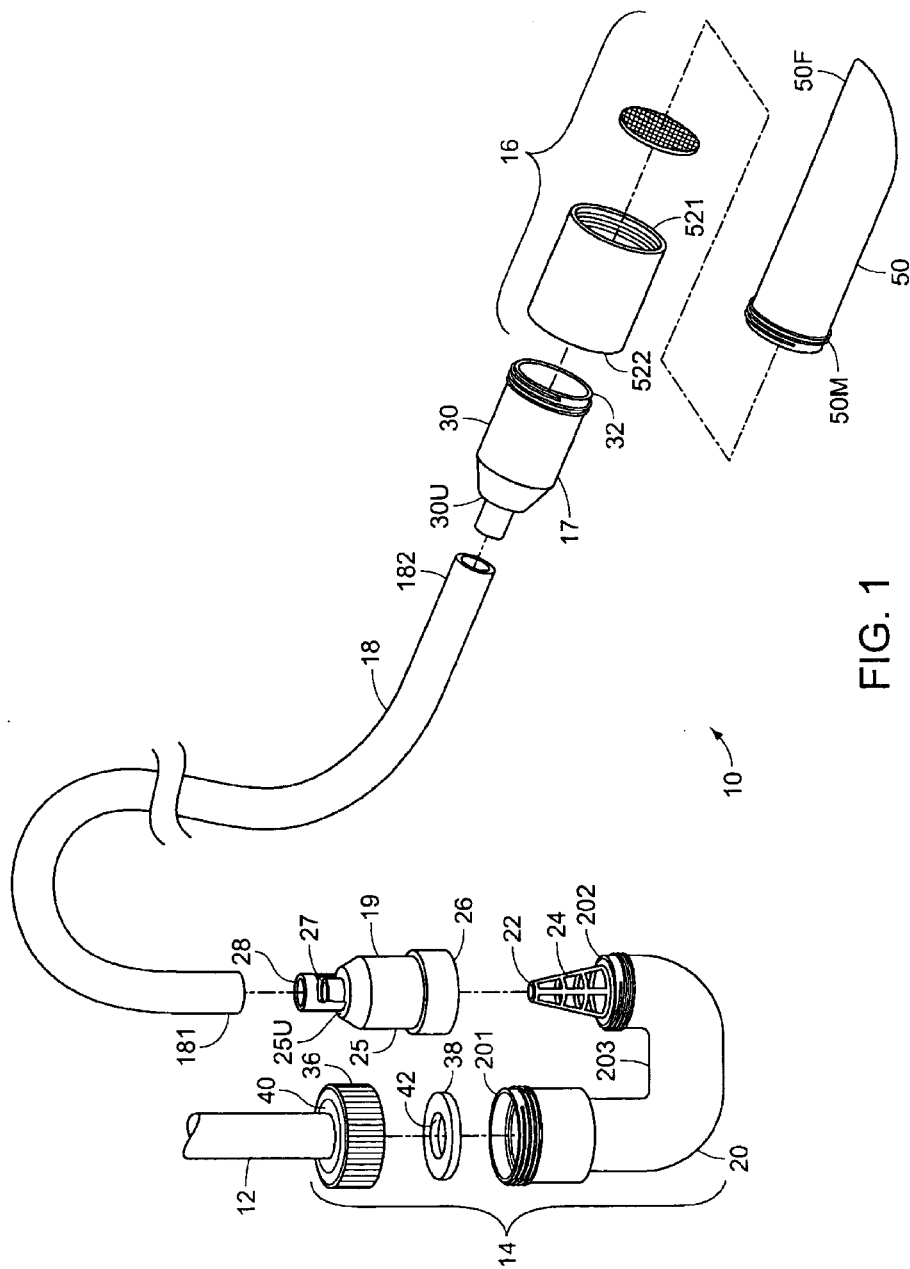
FIG. 1 is an exploded view, illustrating the interconnection of various components of the invention.
Figure 2:
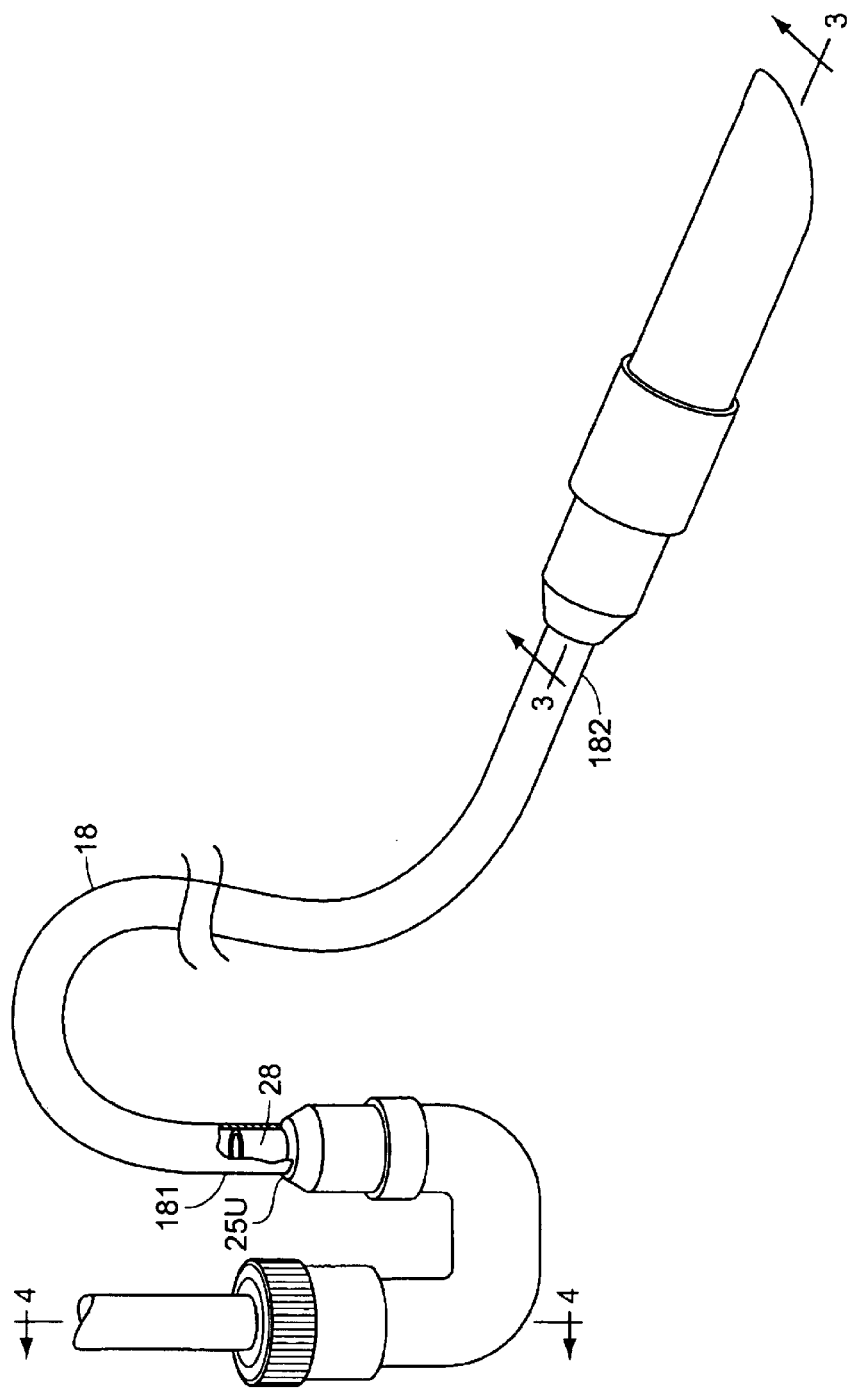
FIG. 2 is a diagrammatic perspective view, illustrating the present invention, per se.

FIG. 1 illustrates a fish tank vacuum 10 for attaching to an existing intake pipe 12. The vacuum 10 has an attachment assembly 14, a nozzle assembly 16, and a flexible hose 18 that connects the attachment assembly 14 and nozzle assembly 16. In particular, the flexible hose 18 is connected to the nozzle assembly 16 with a primary swivel assembly 17, and is connected to the attachment assembly 14 with a secondary swivel assembly 19.

The attachment assembly 14 includes a u-pipe 20 having a first end 201, a second end 202, and a bend 203 therebetween. The first end 201 and second end 202 are both open, externally threaded, and are substantially parallel to each other. The u-pipe 20 is offset such that the second end 202 is closer to the bend 203 than the first end 201. Accordingly, when the first end 201 and second end 202 are oriented upwardly, the second end 202 is lower than the first end 201. A fish screen 22 is removably mounted at the second end 202 extending upwardly from the second end 202. The fish screen 22 has a plurality of apertures 24 that allow water to flow into the second end 202 of the u-pipe 20 yet are each small enough to prevent even a small fish from inadvertently entering the u-pipe 20.

The secondary swivel assembly 19 has a secondary swivel body 25, and a lower mouth 26 that is sized to fit over the fish screen 22 and is internally threaded to secure onto the second end 202 of the u-pipe 20. The secondary swivel body 25 has a transversely extending upper end 25U fully opposite from the lower mouth 26. A swivel seat 27 protrudes outwardly (axially) from the upper end 25U. The swivel seat 27 is itself a short tube having an outside diameter that fits within the flexible tube 18. The secondary swivel assembly 19 has a secondary swivel tube 28 rotatably mounted to the secondary swivel body 25 upon the swivel seat 27 such that said swivel tube is capable of three hundred sixty degree rotation upon the upper end 25U of the secondary swivel body 25.

Figure 3:
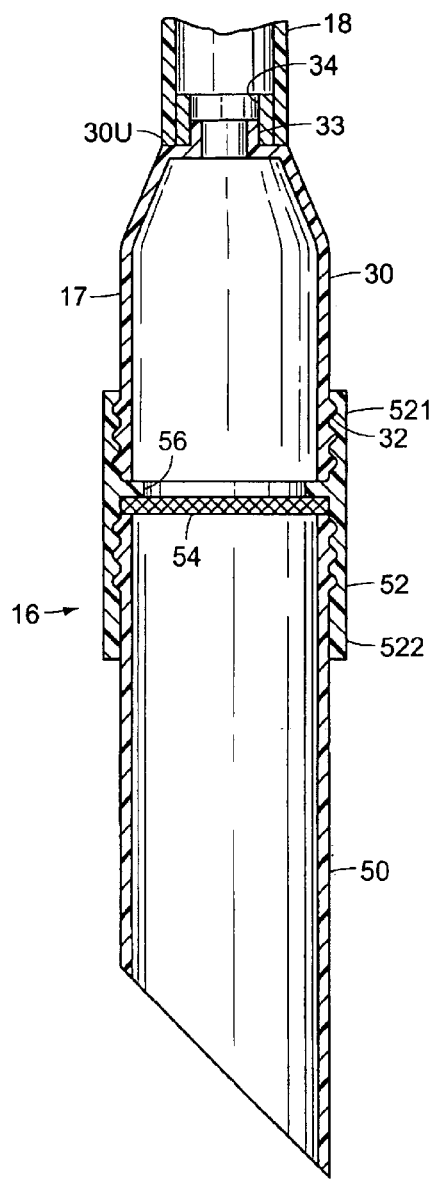
FIG. 3 is a cross sectional view, taken generally in the area indicated by line 3—3 in FIG. 2, showing the filter being held in place within the filter housing by the nozzle, and the connection to the flexible tube with the primary swivel.

The primary swivel assembly 17 has a primary swivel body 30 having an externally threaded lower mouth 32 that is sized to mate with the nozzle assembly 16, and a transversely extending upper end 30U opposite from the threaded lower mouth 32. Referring momentarily to FIG. 3, a swivel seat 33 extends axially and upwardly from the upper end 30U. The swivel seat 33 is itself a short tube. The primary swivel assembly 17 has a primary swivel tube 34 rotatably mounted to the primary swivel body 30, whereas the primary swivel tube 34 is coaxially mounted upon the swivel seat 33 such that the primary swivel tube 34 is capable of three hundred sixty degree rotation upon the primary swivel body 30.

The flexible hose 18 has a first end 181 and a second end 182. The first end 181 is secured onto the secondary swivel tube 34, and the second end 182 is secured onto the primary swivel tube 28. Accordingly, the flexible hose 18 is afforded a great deal of freedom of movement as its ends can freely rotate.

Figure 4:
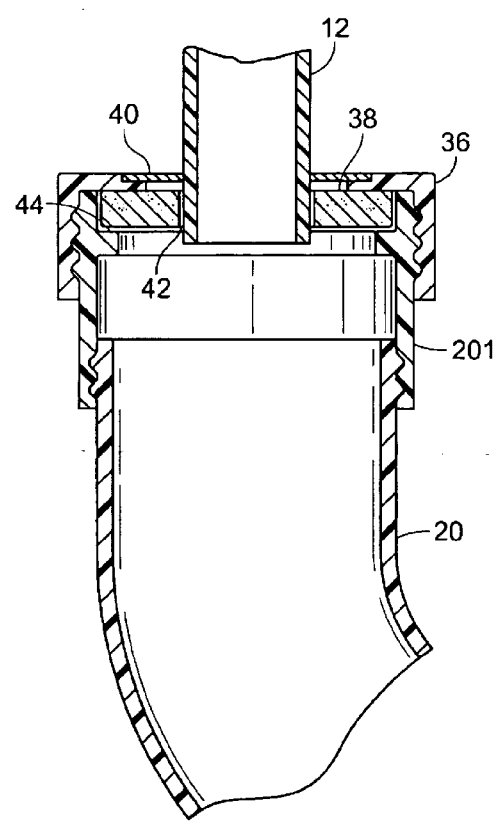
FIG. 4 is a cross sectional view, taken generally in the area indicated by line 4—4 in FIG. 2, showing the interconnection between the attachment assembly and the fish tank intake pipe.

The intake pipe 12 is mated with the first end 201 of the u-pipe 20 with a sealing cap 36 and a sponge washer 38. In particular, the first end 201 is externally threaded, while the sealing cap 36 is internally threaded and sized to fit over the first end 201. The sealing cap 36 has a membrane 40 that has a central aperture that expands, as the intake pipe 12 is inserted therethrough. Accordingly, the sealing cap 36 seals around the intake pipe 12. Further, the sponge washer 38 has a sponge opening 42 that also expands around the intake pipe 12. The sponge washer 38 seated within the first end 201 of the u-pipe, and is tightened against the sealing cap 36. Accordingly, a seal is made with the intake pipe 12 by the sealing cap 36 and the sponge washer 38. Referring to FIG. 4, the first end 201 of the u-pipe has an internal seal shoulder 44 near its opening that seats the sponge washer 38 and allows the sponge washer 38 to be sandwiched between the shoulder 44 and sealing cap 36. In addition, the intake pipe 12 extends through the sponge opening 42 of the sponge washer 38 to remain in fluid communication with the u-pipe 20.

The nozzle assembly 16 has a suction nozzle 50 having an externally threaded mating end 50M and a free end 50F. The suction nozzle 50 is attached to the primary swivel body 30 with a filter housing 52. The filter housing 52 has a first end 521 and a second end 522. Both the first end 521 and second end 522 are internally threaded. Accordingly, the externally threaded lower mouth 32 fits securely within the first end 521 of the filter housing 52. Further, the mating end 50M of the suction nozzle 50 fits securely within the second end 522 of the filter housing 52, bringing the suction nozzle 50 into communication with the primary swivel assembly 17 through the filter housing 52.

Before securing the suction nozzle 50 into the first end 521 of the filter housing 52, a filter disk 54 is inserted into the first end 521 of the filter housing 52. Referring to FIG. 3, the filter housing 52 has an internal filter shoulder 56 against which the filter disk 54 is seated. When the mating end 50M of the suction nozzle 50 is threaded into the first end 521 of the filter housing 52, the filter disk 54 is held securely in place between the suction nozzle 50 and the filter shoulder 56. Thus, to clean or replace the filter disk 54, one need only remove the suction nozzle 50.

Figure 5:
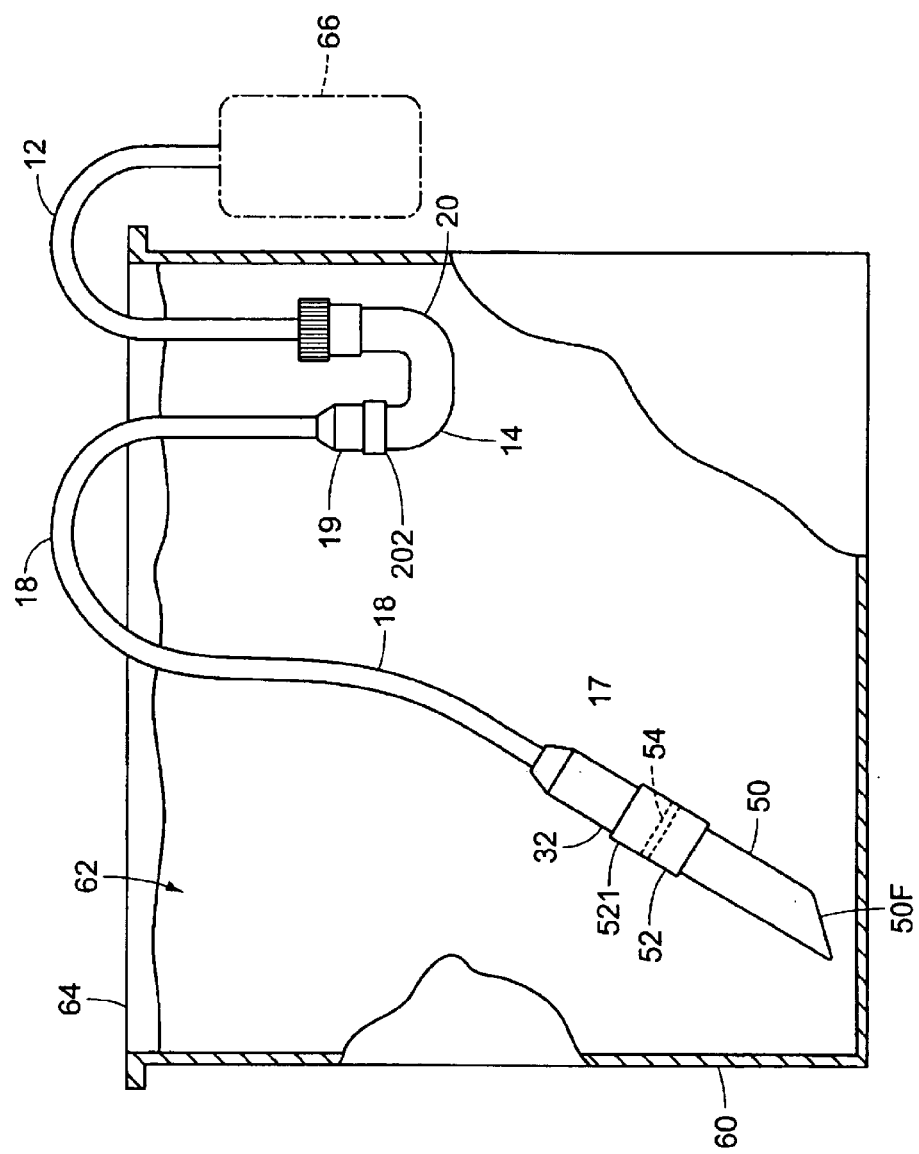
FIG. 5 is a cross sectional view of a fish tank, with the attachment assembly installed within an overflow box of the fish tank.

Referring to FIG. 5, which illustrates a fish tank 60 having a fish tank interior 62, a top rim 64, a filtration system 66 connected to the intake pipe 12. The filtration system 66 draws water from fish tank interior 62 using the intake pipe 12. The attachment assembly 14 is secured to the intake pipe 12 an can flex to extend throughout the tank interior so that debris can be removed using the suction nozzle 50. The suction nozzle 50 preferably has a wide mouth at the free end 50F. In particular, the free end 50F is preferably beveled so as to create a larger opening for debris, and to facilitate convenient use throughout the fish tank interior 62 as illustrated.

The filtration system 66 draws water through the suction nozzle 50, through the filter disk 54 within the filter housing 52, through the primary swivel assembly 17, through the flexible hose 18, through the secondary swivel assembly 19, through the attachment assembly 14, and into the filtration system 66 through the intake pipe 12. As water is water is drawn into the suction nozzle 50, debris is carried therewith. The filter disk 54 prevents large debris from entering and clogging the smaller passageways of the fish tank vacuum such as the flexible tube 18, and from entering the filtration system. Further, the filter disk 54 prevents gravel or other substrate from entering the filtration system. Smaller debris, and living matter such as algae, are picked up by the fish tank vacuum and are removed by the existing filtration system. After use, the secondary swivel assembly 19 should be removed from the second end 202 of the u-pipe 20. The suction nozzle 50 should then be removed from the filter housing 52 so that the filter disk 54 can be removed, rinsed, and reinstalled or replaced. Alternatively, the filter housing 52 can be removed from the primary swivel assembly 17 by removing the threaded lower mouth 32 thereof from the first end 521 of the filter housing 52. Then, the filter disk 54 can be rinsed by introducing water flow into the primary swivel assembly 17 and out of the suction nozzle 50—without removing the filter disk 54.

When the attachment assembly 14 is secured to the intake pipe 12, it can remain in place for an extended period—even when debris is not being removed from the tank. The fish screen 22 prevents fish from inadvertently entering the filtration system through the attachment assembly 14. It should be understood that the fish tank vacuum could be configured to attach to virtually any existing fish tank filtration and pumping system.

In conclusion, herein is presented a fish tank vacuum that attaches to the existing filtration system in a fish tank and facilitates removal of debris from the fish tank interior. The invention is illustrated by example in the drawing figures, and throughout the written description. It should be understood that numerous variations are possible, while adhering to the inventive concept. Such variations are contemplated as being a part of the present invention.

What is claimed is:

1. A fish tank vacuum, for use with a fish tank having a tank interior and an intake pipe that draws water thereinto, comprising:

an attachment assembly, having a u-pipe having a first end, a second end, and a bend therebetween, the first end for attaching to the intake pipe;

a nozzle assembly, having a suction nozzle having a free end and a mating end, and having a filter housing having a first end and a second end, the mating end of the suction nozzle selectively attachable in the first end of the filter housing, the free end is open to allow water and debris to flow thereinto;

a filter disk extending within the filter housing;

a primary swivel assembly attached to the second end of the filter housing, the primary swivel assembly having a primary swivel tube opposite from the filter housing, the primary swivel assembly in fluid communication with the nozzle assembly;

a secondary swivel assembly attached to the second end of the u-pipe, the secondary swivel assembly having a secondary swivel tube opposite from the second end of the u-pipe, the secondary swivel assembly in fluid communication with the attachment assembly; and a flexible hose having a pair of ends, the flexible hose attached over the primary swivel tube on one end and the secondary swivel tube at the other end, the flexible hose providing a fluid connection between the primary swivel assembly and second fluid assembly and allowing the suction nozzle to be maneuvered around the fish tank interior while maintaining a continuous water flow into the free end of the suction nozzle and out to the intake pipe.

2. The fish tank vacuum as recited in claim 1, wherein the second end of the u-pipe has a fish screen extending outwardly therefrom, the fish screen having apertures sized to prevent fish from entering the u-pipe, wherein the secondary swivel assembly having lower mouth that is sized to fit over the fish screen to selectively attach to the second end of the u-pipe to create water flow into the suction nozzle to vacuum debris therewith.

3. The fish tank vacuum as recited in claim 2, wherein the attachment assembly has a sealing cap that is selectively secured to the first end of the u-pipe, the sealing cap having a membrane through which the intake pipe is inserted;

wherein the attachment assembly has a sponge washer having a sponge opening that expands to accommodate the intake pipe as it is inserted therethrough; and wherein the sponge washer is positioned inside the u-pipe and is held tightly therein by the sealing cap.

4. The fish tank vacuum as recited in claim 3, wherein the filter housing has an internal filter shoulder such that the filter disk extends between the internal filter shoulder and the mating end of the suction nozzle and is held in place thereby.

5. The fish tank vacuum as recited in claim 4, wherein the first and second end of the u-pipe are oriented upwardly, are substantially parallel, and the second end of the u-pipe is lower than the first end of the u-pipe.

6. The fish tank vacuum as recited in claim 5, wherein the primary swivel assembly has an externally threaded lower mouth; and the filter housing is internally threaded at its first end to secure the primary swivel assembly therein.

* * * * *